United States Patent
Toyoda et al.

(10) Patent No.: US 7,137,693 B2
(45) Date of Patent: Nov. 21, 2006

(54) INK CONTAINER AND INK CONTAINER-SEALING WRAPPER ASSEMBLY

(75) Inventors: Yoshito Toyoda, Nagoya (JP); Hideo Ohira, Tajimi (JP); Ryuji Kato, Tatsuta-mura (JP); Akihiko Taniguchi, Kisogawa-cho (JP); Masaya Fujioka, Nagoya (JP); Shunichi Higashiyama, Yokkaichi (JP); Masahito Kato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 257 days.

(21) Appl. No.: 10/798,386

(22) Filed: Mar. 12, 2004

(65) Prior Publication Data

US 2004/0183874 A1 Sep. 23, 2004

(30) Foreign Application Priority Data

Mar. 18, 2003 (JP) .............................. 2003-074053

(51) Int. Cl.
*G01D 11/00* (2006.01)
*B41J 2/175* (2006.01)

(52) U.S. Cl. ........................................ 347/100; 347/86
(58) Field of Classification Search .................. 347/86, 347/87, 100
See application file for complete search history.

(56) References Cited

U.S. PATENT DOCUMENTS

| | | | | |
|---|---|---|---|---|
| 4,429,320 A | * | 1/1984 | Hattori et al. | 347/86 |
| 4,577,203 A | * | 3/1986 | Kawamura | 347/30 |
| 4,928,126 A | * | 5/1990 | Asai | 347/86 |
| 5,611,461 A | * | 3/1997 | Kubota et al. | 222/105 |
| 6,585,362 B1 | * | 7/2003 | Blease et al. | 347/92 |
| 2002/0080213 A1 | * | 6/2002 | Shimada et al. | 347/68 |

FOREIGN PATENT DOCUMENTS

| | | | |
|---|---|---|---|
| DE | 29 08 091 A1 | * | 9/1997 |
| JP | A 60-209209 | | 10/1985 |
| JP | B2 3-61592 | | 9/1991 |
| JP | A-05-320549 | | 12/1993 |
| JP | A-08-183566 | | 7/1996 |
| JP | A 10-36729 | | 2/1998 |
| JP | 2001091952 | * | 4/2001 |

* cited by examiner

*Primary Examiner*—Anh T. N. Vo
(74) *Attorney, Agent, or Firm*—Oliff & Berridge, PLC (57) ABSTRACT

An ink container including water-based ink for ink-jet recording and a package in which the water-based ink is accommodated, wherein the water-based ink includes an inert gas dissolved therein and an amount of oxygen dissolved in the water-based ink for ink-jet recording is less than 3 mL/L.

20 Claims, 2 Drawing Sheets

INK CONTAINER AND INK CONTAINER-SEALING WRAPPER ASSEMBLY

The present application is based on Japanese Patent Application No. 2003-074053 filed on Mar. 18, 2003, the contents of which are incorporated herein by reference.

BACKGROUND OF THE INVENTION

1. Field of the Invention

The present invention relates to an ink container and an ink container-sealing wrapper assembly.

2. Discussion of Related Art

In general, in, an ink-jet recording method, droplets of ink are formed by various ink ejecting methods and a portion or all of the ink droplets are fixed or sprayed on a recording medium such as a sheet of paper to perform printing. There are known various ink ejecting methods such as a method of electrostatically sucking ink, a method of mechanically oscillating or displacing ink by using piezoelectric elements, a method of heating ink to generate air bubbles and ejecting the ink by a pressure produced when the ink is bubbled. In a printing head of an ink-jet recording apparatus which utilizes the piezoelectric elements as described above, the amount of electric power consumption is smaller than in the method that utilizes the pressure produced upon generation of the air bubbles by application of heat to the ink. In addition, the printing head which utilizes the piezoelectric elements is advantageous in that the stability of the ink with respect to heat can be ignored since the ink is not exposed to heat.

A water-based ink for such, an ink-jet recording apparatus is known and practically used. The known water-based ink is prepared by dissolving or dispersing various water-soluble dyes or pigments in water or an aqueous medium including water and a water-soluble organic solvent. Such water-based ink for ink-jet recording is needed to exhibit optimum properties and characteristics as follows: The ink has a good introduction property that permits the ink to be easily introduced into nozzles of a printing head of the ink-jet recording apparatus. The ink does not cause any clogging at the nozzles and in ink channels which arises from agglomeration or precipitation of the components in the ink, and has good ejection performance. The ink assures a high degree of print quality. The ink does not cause corrosion of components or materials of the ink-jet recording apparatus which are formed of metal, resin, adhesive agent, etc.

The water-based ink for ink-jet recording is manufactured by a process including a step of dissolving or dispersing an ink material including a dye or a pigment in a solvent and a step of filtering a solution of the ink material. Where the ink as manufactured by the process is contained in a package for use on the ink-jet recording apparatus, oxygen dissolved in the ink deteriorates a part of the ink material, so that the ink cannot maintain its optimum properties and characteristics for a long period of time. Especially where the ink material includes glycol ethers or surfactants having polyoxyethylene chains, the ether link portions of those materials and the oxygen dissolved in the ink are subjected to autoxidation, thereby undesirably causing changes in the properties of the ink, or producing agglomerates or deposits. In this case, the ink suffers from deterioration in its introduction property and ejection property. Further, the printing quality is undesirably lowered. In addition, aldehydes, carboxylic acids, etc., generated by autoxidation deteriorate the coloring material of the ink, and cause corrosion of metallic materials of the components of the ink-jet recording apparatus. Thus, the oxygen dissolved in the ink causes a risk of considerably deteriorating reliability of the ink-jet recording apparatus.

To avoid the drawback described above, it has been practiced to carry out a deaerating or degassing treatment of the ink, so as to remove the oxygen dissolved in the ink before the ink is accommodated in a package. This deaerating treatment involves, for instance, an operation to stir the ink within a pressure vessel at a reduced pressure and an operation using a deaerating device equipped with a gas permeation membrane.

In general, since the package for accommodating the deaerated ink is a box-like container obtained by injection molding of resin such as polypropylene or polyethylene, or a bag obtained by welding laminated films of resin such as polyester or polyamide, such a container or a bag used as the package for accommodating the deaerated ink has a slight degree of gas permeation. Accordingly, it is impossible, from the standpoint of cost, to store the ink in a fluid-tightly accommodated state for a long time period while being isolated from the outside air. Even where the deaerated ink is accommodated in the package described above, the air inevitably enters the package with a lapse of time, so that the air including the oxygen is again dissolved in the ink, whereby the properties and the characteristics of the ink are gradually deteriorated.

JP-B2-3-61592 discloses a technique to prevent the oxygen from being dissolved again in the deaerated ink. According to this technique, an ink container filled with the deaerated ink is accommodated in a sealing container, and the sealing container is kept under a reduced pressure during transportation or storage. In installing the ink container on the ink-jet recording apparatus, however, the ink container needs to be taken out of the sealing container. After the ink container has been installed on the ink-jet recording apparatus, it is impossible to prevent the air from being dissolved in the ink, so that the properties and characteristics of the ink are inevitably deteriorated.

SUMMARY OF THE INVENTION

It is therefore an object of the present invention to provide an ink container in which a water-based ink for ink-jet recording is accommodated and an ink container-sealing wrapper assembly, which prevent dissolution of oxygen in the ink for a long period of time even after the ink container has been installed on an ink-jet recording apparatus, for thereby preventing deterioration in ink introduction property and ink ejection stability.

The object indicated above may be achieved according to a first aspect of this invention, which provides a an ink container including water-based ink for ink-jet recording- and a package in which the water-based ink is accommodated, wherein the water-based ink includes an inert gas dissolved therein and an amount of oxygen dissolved in the water-based ink for ink-jet recording is less than 3 mL/L.

In the water-based ink for ink-jet recording accommodated in the ink container according to, the above-indicated first aspect of the invention, it is possible to prevent oxygen from being dissolved in the ink oven while the ink container is in a state in which the ink container is exposed to the atmosphere, e.g., in a state in which the ink container is installed on the ink-jet recording apparatus, thereby preventing changes in the properties of the ink and generation of agglomerates or deposits in the ink. Therefore, the water-based ink described above can be easily introduced into the ink-jet recording apparatus and ejected from the apparatus with high stability.

In the present ink container, the inert gas preferably comprises argon. Preferably, the package includes an ink bag consisting of a laminar structure which includes at least a resin film layer and a metal film layer that are superposed on each other, and an ink inlet formed of resin. Preferably, the package has oxygen permeability of not greater than 1.0 mL/m$^2$·24 hr·atm.

The object indicated above may also be achieved according to a second aspect of this invention, which provides an ink container-sealing wrapper assembly including an ink container as described above and a sealing wrapper in which the ink container is accommodated, an interior space within the sealing wrapper existing between the ink container and the sealing wrapper is charged with an inert gas.

In the present ink container-sealing wrapper assembly wherein the interior space within the sealing wrapper existing between the ink container and the sealing wrapper is charged or filled with the inert gas, it is possible to prevent oxygen from being dissolved in the ink during transportation or storage of the ink prior to installation of the ink container on the ink-jet recording apparatus. Accordingly, the water-based ink for ink-jet recording accommodated in the ink container is prevented from suffering from deterioration in its properties for a long period of time. Preferably, the inert gas comprises argon.

BRIEF DESCRIPTION OF THE DRAWINGS

The above and other objects, features, advantages and technical and industrial significance of the present invention will be better understood by reading the following detailed description of a preferred embodiment of the invention, when considered in connection with the accompanying drawings, in which.

DERAILED DESCRIPTION OF THE PREFERRED EMBODIMENTS

The ink container according to the present invention includes water-based ink for ink-jet recording and a package in which the water-based ink is accommodated. In the water-based ink in which the inert gas and the oxygen are dissolved, the inert gas is dissolved such that a partial pressure of the inert gas is higher than that of the oxygen. In other words, owing to the high partial pressure of the inert gas in the package of the ink container, the amount of oxygen to be dissolved in the ink is small even if the oxygen permeates through the package due to exposure of the package to the air, since the partial pressure of the oxygen in the package is low. Accordingly, it is possible to prevent oxygen from being dissolved in the ink even while the ink container is in a state in which the ink container is installed on the ink-jet recording apparatus, thereby preventing deteriorations in the properties of the ink due to oxidation. In addition, since the inert gas does not react with the materials of the ink and the materials of the components of the ink-ret recording apparatus, the inert gas does not cause deterioration of the water-based, ink and corrosion of the components of the ink-jet recording apparatus.

The inert gas is not particularly limited, as long as it is chemically inert. Examples of the inert gas include argon, helium, neon, and nitrogen. Among those, the argon is particularly preferable. In the water-based ink in which the argon is dissolved such that the partial pressure of the argon is higher than that of the oxygen, it is speculated that, owing to the high partial pressure of the argon in the package, the amount of oxygen to be dissolved in the ink is small even if the oxygen permeates through the package due to exposure of the package to the air, since the partial pressure of the oxygen in the package is low. Further, since the argon is less likely to permeate through the package owing to its relatively large molecular weight, the argon does not go out of the package and the high partial pressure of the argon in the package can be maintained, so that the oxygen is less likely to be dissolved in, the ink. Accordingly, the argon dissolved in the water-based ink for ink-jet recording makes it possible to, inhibit an increase in the amount of oxygen dissolved in the ink over a long period of time. This speculation is made based on an imaginary gaseous phase in the package since there exists actually no gaseous phase in the package.

Preferably, the inert gas is dissolved in the water-based ink such that the inert gas is in a saturated state or in a substantially saturated state in the ink. Though the ink in which the inert gas is dissolved in the saturated state is produced to attain a theoretical saturated state of the inert gas, the saturated state of the inert gas in the produced ink is not actually the theoretical saturated state, but corresponds to a practically satisfactory saturated state. The ink in which the inert gas is dissolved in the substantially saturated state is produced to attain a saturated state of the inert gas corresponding to more than 80% or more than 90%. of the theoretical saturated state. According to these arrangements, the partial pressure of the argon in the package is further increased, for thereby preventing the oxygen from being dissolved in the water-based ink more effectively.

in the water-based ink for ink-jet recording, the amount of oxygen dissolved therein is less than 3 mL/L. If the amount of dissolved oxygen is 3 mL/L or larger, the oxygen dissolved in the ink and the materials of the ink such, as glycol ethers and surfactants suffer from autoxidation, undesirably causing changes in the properties of the ink and producing agglomerates and deposits. In this case, the ink suffers from deterioration in its introduction property into the ink-jet recording apparatus and ejection property from the apparatus. Further, the printing quality is undesirably lowered. In addition, the metallic materials of the components of the ink-jet recording apparatus suffer from corrosion.

The water-based ink for ink-jet recording according to the present invention contains water. It is preferable to employ purified water or distilled water having a relatively high degree of purity, rather than ordinary tap water.

The water-based ink for ink-jet recording according to the present invention contains at least one water-soluble organic solvent. The water-soluble organic solvent to be employed for the present water-based ink for ink-jet recording is not particularly limited, and may be generally classified into the following two kinds substances that exhibit an effect of preventing the ink from being dried at the nozzles of the printing head of the ink-jet recording apparatus; and substances effective to increase a drying speed of the ink at which the ink is dried on a recording medium or paper. Examples of the water-soluble organic solvent which exhibits the effect of preventing the drying of ink include lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; alkylene glycols such as ethylene glycol, propylene glycol, butylene glycol, diethylene glycol, triethylene glycol, dipropylene glycol, tripropylene glycol, thiodiglycol, and hexylene glycol; glycerin; 2-pyrrolidone; N-methyl-2-pyrrolidone; 1,3-dimethyl-2-imidazolidinone. Particularly preferably employed are glycerin and alkylene glycols such as diethylene glycol.

The water-soluble organic solvent having the effect of preventing the drying of ink is contained in the ink preferably in an amount of 5–40% by weight of a total weight of the ink. Where the amount of the water-soluble organic solvent is less than 5% by weight, the ink may not have sufficient wetness and may suffer from deposition and drying-up or hardening. Where the amount of the water-soluble organic solvent which is effective to prevent the drying of ink exceeds 40% by weight, on the other hand, the viscosity of the ink may be excessively increased. In this case, the ink cannot be ejected from the nozzles or the ink is dried on the recording medium undesirably at an extremely low speed. Such a water-soluble organic solvent is contained in the ink more preferably in an amount of 10–30% by weight.

Examples of the water-soluble organic solvent effective to increase the drying speed of the ink are not particularly limited, but may include glycol ethers such as ethylene glycol monomethyl ether, ethylene glycol monoethyl ether, ethylene, glycol monopropyl ether, diethylene glycol monomethyl ether, diethylene glycol monoethyl ether, diethylene glycol monopropyl ether, triethylene glycol monomethyl ether, triethylene glycol monoethyl ether, triethylene glycol monopropyl ether, propylene glycol monomethyl ether, propylene glycol monoethyl ether, propylene glycol monopropyl ether, dipropylene glycol monomethyl ether, dipropylene glycol monoethyl ether, dipropylene glycol monopropyl ether, tripropylene glycol monomethyl ether, tripropylene glycol monoethyl ether, and tripropylene glycol monopropyl ether.

The water-soluble organic solvent effective to increase the drying speed of the ink is contained in the ink preferably in an amount of 0.1–15% by weight of the total weight of the ink. Where the amount of the water-soluble organic solvent for increasing the drying speed of the ink is less than 0.1% by weight, the speed of penetration of the ink to the recording medium becomes low, undesirably resulting in an increased drying time and causing bleeding or blurring. Where the amount of the water-soluble organic solvent exceeds 15% by weight, the ink penetrates to the recording medium to an excessive extent. For instance, the ink may penetrate undesirably to the back of the recording medium, resulting in blurring. Such a water-soluble organic solvent is contained in the ink more preferably in an amount of 1–10% by weight. These water-soluble organic solvents described above may be used alone, or two or more of those may be used in combination.

The water-based ink for ink-jet recording according to the present invention contains at least one coloring agent such as a water-soluble dye and a pigment. The water-soluble dye is not particularly limited, but may include direct dyes, acid dyes, basic dyes, reactive dyes, etc. For satisfying the characteristics required by the water-soluble dye such as clearness, water-solubility, stability, light resistance, etc., the water-soluble dye is preferably selected from among Color Index Numbers of Direct Black 17, 19, 32, 51, 71, 108, 146, 154, 168; Color Index Numbers of Direct Blue 6, 22, 25, 71, 86, 90, 106, 199; Color Index Numbers of Direct Red 1, 4, 17, 28, 80, 83, 227; Color Index Numbers of Direct Yellow 12, 24, 26, 86, 98, 132, 142; Color Index Numbers of Direct Orange 34, 39, 44, 46, 60; Color Index Numbers of Direct Violet 47, 48; Color Index Number of Direct Brown 109; Color Index Number of Direct Green 59; Color Index Numbers of Acid Black 2, 7, 24, 26, 31, 52, 63, 112, 118; Color Index Numbers of Acid Blue 9, 22, 40, 59, 93, 102, 104, 113, 117, 120, 167, 229, 234; Color Index. Numbers of Acid Red 16, 32, 37, 51, 52, 80, 85, 87, 92, 94, 115, 181, 256, 289, 315, 317; Color Index Numbers of Acid Yellow 11, 17, 23, 25, 29, 42, 61, 71; Color Index Numbers of Acid Orange 7, 19; Color Index. Number of Acid Violet 49; Color Index Number of Basic Black 2; Color Index Numbers of Basic Blue 1, 3, 5, 7, 9, 24, 25, 26, 28, 29; Color Index Numbers of Basic Red 1, 2, 9, 12, 13, 14, 37; Color Index Numbers of Basic Violet 7, 14, 27; Color Index. Numbers, of Food Black 1, 2; Color Index Numbers of Reactive Black 1, 3, 5, 6, 8, 12, 14; Color Index Numbers of Reactive Yellow 1, 2, 3, 13, 14, 15, 17; Color Index Numbers of Reactive Orange 2, 5, 7, 16, 20, 24; Color Index Numbers of Reactive Red 6, 7, 11, 12, 15, 17, 21, 23, 24, 35, 36, 42, 63, 66, 180; Color Index Numbers of Reactive Violet 2, 4, 5, 8, 9; Color Index Numbers of Reactive Blue 2, 5, 7, 12, 13, 14, 15, 17, 18, 19, 20, 21, 25, 27, 28, 37, 38, 40, 41, 71; Color Index Numbers of Reactive Green 5, 7; and Color Index Numbers of Reactive Brown 1, 7, 16. These water-soluble dyes may be used alone, or two or more of those may be used in combination.

The pigment is not particularly limited, but may include an inorganic pigment and an organic pigment. Examples of the pigment suitably used for production of black-and-white images include carbon blacks such as furnace black, lamp black, acetylene black, and channel black; metal oxides such as titanium oxide, and organic pigments such as orthonitroaniline black. Examples of the pigment suitably used for production of color images include Toluidine Red, Permanent Carmine FB, Fast Yellow AAA, Disazo Orange PMP, Lake Red C, Brilliant Carmine 6B, Phthalocyanine Blue, Quinacridone Red, Dioxane Violet, Victoria Pure Blue, Alkali Blue Toner, Fast Yellow 10G, Disazo Yellow AAOT, Disazo Yellow AAMX, Disazo Yellow HR, Disazo Yellow AAOA, yellow iron oxide, Orthonitroaniline Orange, Dinitroaniline Orange, Vulcan Orange, Toluidine Red, chlorinated Para Red, Brilliant First Scarlet, Naphthol Red 23, Pyrazolone Red, Barium Red 2B, Calcium Red 2B, Strontium Red 2B, Manganese Red 2B, Barium Lithom Red, pigment scarlet 3B Lake, Lake Bordeaux 10B, Ansosine 3B Lake, Ansosine 5B Lake, Rhodamine 6G Lake, Eosine Lake, red ion oxide, Faphtol Red FGR, Rhodamine B Lake, Methyl Violet Lake, Dioxazine Violet, Basic Blue 5B Lake, Basic Blue 6G Lake, Fast Sky Blue, alkali Blue R Toner, Peacock Blue Lake, Prussian Blue, Ultramarine Blue, Reflex Blue 2G, Reflex Blue R, Brilliant Green Lake, Diamond green Thioflavine Lake, Phthalocyanine Green G, Green Gold, Phthalocyanine Green Y, iron oxide, rust powder, zinc white, titanium oxide, calcium carbonate, clay, barium sulfate, alumina white, aluminium, bronze, daylight fluorescent pigment, pearl pigment, Naphthol carmine FB, Naphthol Red M, Permanent carmine FB, Fast Yellow G, Disazo Yellow AAA, Alkali Blue G Toner, and surface modified pigments thereof in which the surfaces of those pigments are treated with a predetermined functional group. Each of the water-soluble dyes and each of the pigments described above may be used alone. Alternatively, two or more water-soluble dyes, or two or more pigments may be used in combination. Further, the water-soluble dye's and the pigments, may be used in combination.

Where the at least one pigment is contained in the ink, there may be added a dispersing agent, as needed. The dispersing agent is not particularly limited, but may be selected from among high-molecular polyurethane, polyester, high-molecular copolymers having a functional group such as a carbonyl group or an amino group, which functional group exhibits a high degree of affinity to the, pigment.

While the amount of the coloring agent to be used is suitably determined depending upon the desired print density or color tone, it is preferably held in a range of 0.1–20% by weight of the total weight of the ink, more preferably in a range of 0.3–10% by weight. The amount of the dispersing agent to be used is generally held in a range of 0.01–10% by weight of the total weight of the ink.

The water-based ink for ink-jet recording according to the present invention is basically constituted as described above. To the water-based ink for ink-jet recording described above, there may be added, as needed, any known additives such as resin binders, surfactants, viscosity adjusting agents, surface tension adjusting agents, pH adjusting agents, dye dissolving agents, antiseptic and mildew proofing agents. Where the present water-based ink for ink-jet recording is used for ink-jet system in which the ink is ejected by the action of thermal energy, the thermal properties such as specific heat, coefficient of thermal expansion, and thermal conductivity may be adjusted.

It is preferable that the package of the ink container according to the present invention has oxygen permeability of not greater than 1.0 mL/m$^2$·24 hr·atm. Where the water-based ink for ink-jet recording is accommodated in the package having such a low degree of oxygen permeability, the oxygen is less likely to permeate through the package even if the package is exposed to the air, thereby effectively preventing the oxygen from being dissolved in the water-based ink. Preferably, the oxygen permeability of the package is not greater than 0.5 mL/m$^2$·24 hr·atm.

For instance, the package includes an ink bag formed of a laminar structure which includes at least a resin film layer and a metal film layer that are superposed on each other, and an ink inlet formed of resin. Alternatively, the package may have a box-like shape obtained by injection molding of resin such as polypropylene or polyethylene. It is preferable to employ the package including the ink bag formed of the laminar structure of the resin film and the metal film described above and the ink inlet formed of resin, in view of a low degree of oxygen permeability and a high degree of resistance to shock. The laminar structure of the ink bag may be a laminar structure consisting of a polyamide layer, an aluminum alloy layer, a polyethylene terephthalate, and a polypropylene which are superposed on one another. The laminar structure may be formed of a polyethylene terephthalate film on which alumina is deposited or an aluminium foil on which a polyethylene film is laminated. As the resin film, there may be employed an ethylene vinyl alcohol copolymer, polyamide, etc.

The ink inlet may be in the form of a spout into which a plug formed of rubber, etc. is press-fitted. The spout is formed of resin such as polyethylene or polypropylene.

The ink container constructed according to the present invention accommodates the water-based ink for ink-jet recording in which the argon is dissolved and in which the amount of dissolved oxygen is less than 3 mL/L. In the water-based ink, the argon is dissolved such that the partial pressure of the argon is higher than that of the oxygen. It is speculated that, owing to the high partial pressure of the argon in the package, the amount of oxygen to be dissolved in the ink is small even if the oxygen permeates through the package due to exposure of the package to the air, since the partial pressure of the oxygen in the package is low. Accordingly, in a state in which the ink container is mounted on the ink-jet recording apparatus, it is possible to prevent the oxygen from being dissolved in the ink, for thereby avoiding deterioration in the properties and characteristics of the water-based ink.

The ink container-sealing wrapper assembly according to the present invention includes the ink container constructed as described above and a sealing wrapper in which the ink container is accommodated. The present ink container-sealing wrapper assembly is characterized in that an interior space within the sealing wrapper existing between the ink container and the sealing wrapper is filled with an inert gas.

Owing to the inert gas existing between the ink container and the sealing wrapper, the dissolution of oxygen in the ink is prevented during transportation or storage of the ink container prior to installation thereof on the ink-jet recording apparatus. Accordingly, the water-based ink for ink-jet recording accommodated in the ink container described above does not suffer from deterioration over a long period of time.

The inert gas is not particularly limited, as long as it is chemically inert. Examples of the inert gas include argon, helium, neon, and nitrogen. Among those, the argon is particularly preferable. In the water-based ink in which the argon is dissolved such that the partial pressure of the argon is higher than that of the oxygen, it is speculated that, owing to the high partial pressure of the argon in the package, the amount of oxygen to be dissolved in the ink is small even if the oxygen permeates through the package due to exposure of the package to the air, since the partial pressure of the oxygen in the package is low. Further, since the argon is less likely to permeate through the package owing to its relatively large molecular weight, the argon does not go out of the package and the high partial pressure of the argon in the package can be maintained, so that the oxygen is less likely to be dissolved in the ink. In addition, since the interior space of the sealing wrapper existing between the ink container and the ink package is filled with the argon, it is possible to inhibit an increase in the amount of oxygen dissolved in the ink over a long period of time. In the ink container-sealing wrapper assembly of the present invention, the interior space of the sealing wrapper filled with the argon may be kept at a reduced pressure, a positive pressure, or a pressure substantially equal to an atmospheric pressure.

The sealing wrapper is not particularly limited, as long as it has a low degree of oxygen permeability. For instance, the sealing wrapper may be formed of a film formed from resin such as polyester, polyethylene, polypropylene, or polyamide. Alternatively, the sealing wrapper may be formed, of a film formed from the resin on which alumina is deposited. The sealing wrapper may be a single-layer structure or a laminated structure.

Figure 1A:
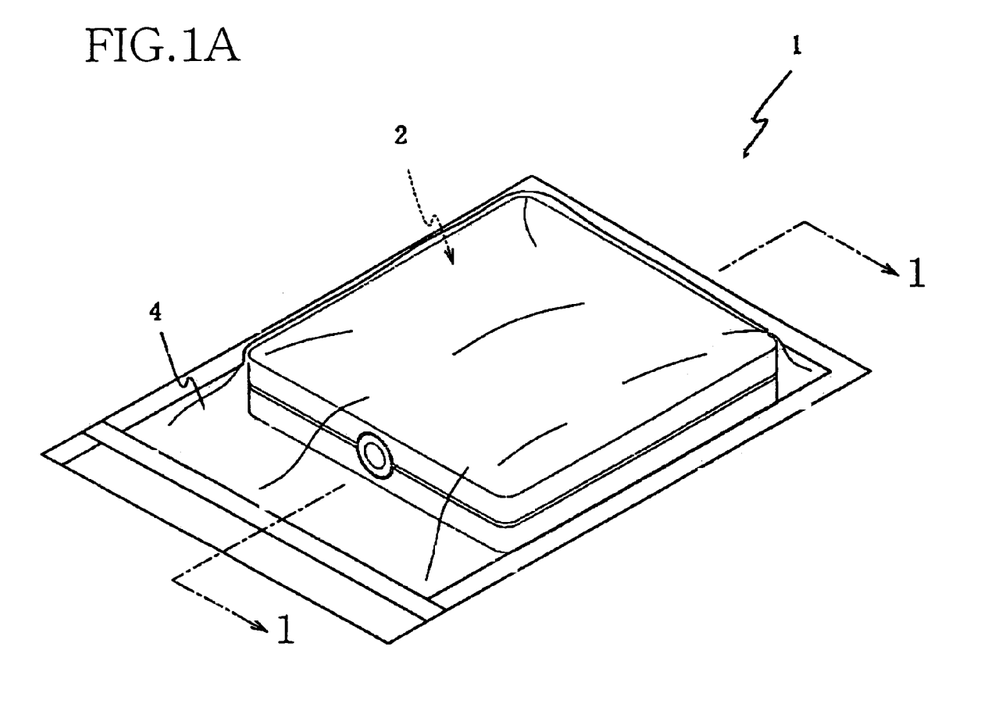
FIG. 1A is a perspective view of an ink container-sealing wrapper assembly constructed according to one embodiment of the present invention and FIG. 1B is an elevational view in cross section taken along line 1—1 of FIG. 1A.
Figure 1B:
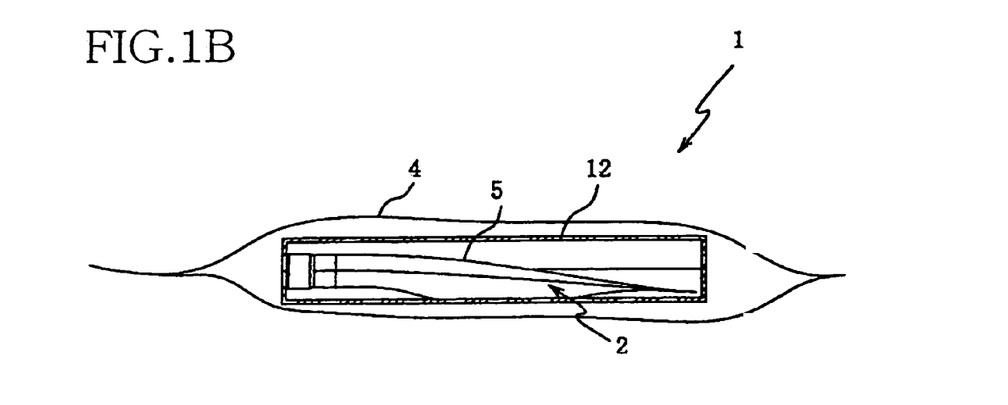

As shown in the perspective view of FIG. 1A showing an ink container-sealing wrapper assembly, generally indicated at 1 and constructed according to one embodiment of the present invention and the cross sectional view of FIG. 1B taken along line 1—1 of FIG. 1A, the, ink container-sealing wrapper assembly 1 of the present invention includes an ink container 2 which accommodates the water-based ink for ink-jet recording, a casing 12 which accommodates the ink container 2, and a sealing wrapper 4 in which the casing 12 that accommodates the ink container 2 is enclosed. The interior space within the sealing wrapper 4 existing between the ink container 2 and the sealing wrapper 4 is charged with argon. Where the ink container 2 is accommodated in the casing 12, the interior space of the casing 12 is filled with the argon, so that the ink container 2 is effectively kept to be exposed to a prescribed suitable amount of the argon, without a need of increasing an overall volume of the ink container-sealing wrapper assembly 1. The sealing wrapper 4 is formed of two laminar sheets which are less likely to permit oxygen therethrough and which are heat-welded along their peripheries in an atmosphere of argon.

Figure 2:
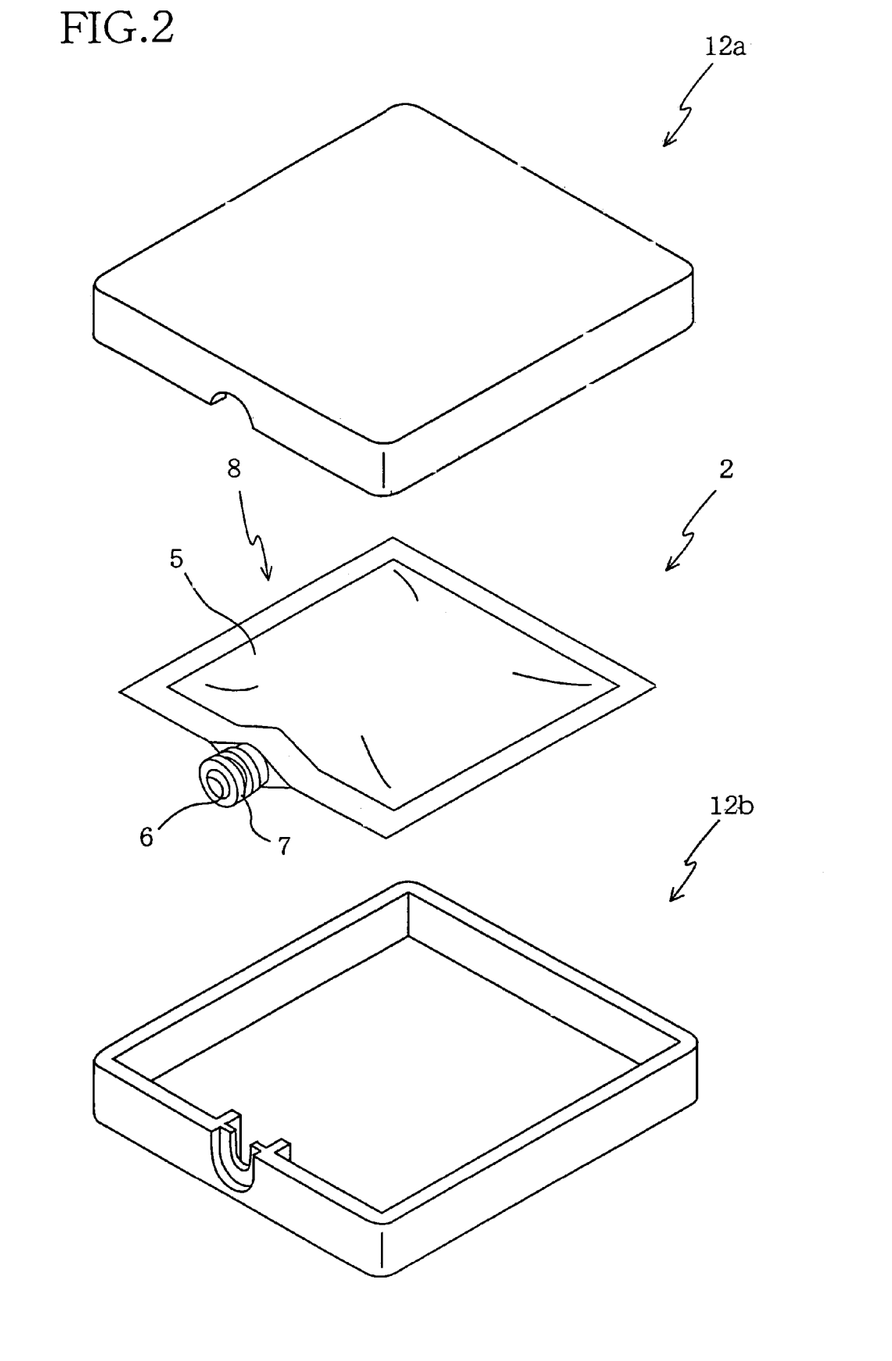
FIG. 2 is an exploded perspective view showing the ink container and a casing in which the ink container is accommodated.

As shown in the exploded perspective view of FIG. 2, the, ink container 2 includes a package 8 in which the water-based ink for ink-jet recording is accommodated. The package 8 includes an ink bag 5 accommodating the ink, a spout 7 having a passage for communication between an interior space and an exterior space of the ink bag 5, and a plug 6 press fitted in the spout 7. The ink container 2 is accommodated in the casing 12 which consists of an upper member 12a and a lower member 12b. The ink bag 5 is formed from two sheets each in the form of a laminar structure consisting of a plurality of films which are superposed on one another and which are less likely to permit oxygen therethrough. The two sheet are welded together with the spout 7 being interposed therebetween. The spout 7 is arranged such that the closure member in the form of the plug 6 is press-fitted in the spout 7, so as to close the passage, that is, to fluid-tightly isolate the interior and exterior spaces of the ink bag 5. The amount of oxygen dissolved in the water-based ink accommodated in the ink container 2 is reduced by dissolving argon in the ink after the ink has been deaerated. The plug 6 is formed of rubber which exhibits a high degree of elasticity or resiliency that assures a sufficient degree of fluid-tightness of the ink bag 5 after a hollow ink-extracting needle that has pierced the plug 6 is removed from the plug 6. The plug is pierced with the hollow needle, so that the water-based ink in the ink container 2 is supplied to the ink-jet recording apparatus.

EXAMPLES

To further clarify the present invention, some examples of the present invention will be described. It is to be understood that the present invention is not limited to the details of these examples and the foregoing description.

Example 1

Preparation of Water-based Ink for Ink-Jet Recording

An ink solvent was prepared as follows 41.3 parts by weight of purified water, 25 parts by weight of glycerin, 0.5 parts by weight of dipropylene glycol monopropyl ether, 0.2 parts by weight of a nonionic surfactant ("NAROACTY 100" available from Sanyo Chemical Industries, Ltd.) were mixed and stirred for 10 minutes. To the obtained ink solvent, there was added 33 parts by weight of black pigment dispersed material ("CABO-JET 300" available from Cabot Corporation) formed of water and carbon black (solid component of 15%). After the mixture was stirred for 30 minutes, the mixture was filtered through a membrane filter having a pore size of 1 μm, for thereby providing black ink K.

Argon Dissolving Treatment

To an evaporator ("RE-540B" available from Yamato Scientific Co., Ltd.), there was connected a pressure-proof 500 mL-flask in which 200 mL of the black ink K prepared as described above was accommodated. With the pressure-proof flask being rotated at 120 rpm, the evaporator was evacuated to 4 kPa by using a vacuum pump. The evaporator was kept at the reduced pressure for 10 minutes. Then, the vacuum pump was stopped while argon was introduced into the evaporator, so that the oxygen dissolved in the ink was removed and the argon was dissolved in the ink such that the argon was in a saturated state in the ink. Thereafter, the pressure in the evaporator was returned to normal pressure. Thus, there was obtained black ink KA.

Preparation of Ink Container-sealing Wrapper Assembly

The black ink KA obtained as described above was accommodated in a package shown in FIG. 2 to provide an ink container. The ink container was then enclosed in a sealing wrapper, as shown in FIG. 1, so that there was obtained an ink container-sealing wrapper assembly in which the ink container accommodating the black ink KA was enclosed. The ink bag of the package was formed of a laminar structure in which a polyamide layer, an aluminum alloy layer, a polyethylene terephthalate layer, and a polypropylene layer were superposed on one another in this order. The oxygen permeability of the package was not greater than 0.5 mL/$m^2$·24 hr·atm. The ink pack container was enclosed in the sealing wrapper such that the interior space within the sealing wrapper existing between the ink container and the sealing wrapper was evacuated.

Example 2

Preparation of Water-based Ink for Ink-jet Recording

Yellow ink Y was obtained as follows: 71 parts by weight of purified water, 4 parts by weight of Color Index Number of Direct Yellow 132, 18 parts by weight of triethylene glycol, and 7 parts by weight of triethylene glycol monobutyl ether were mixed and stirred for 30 minutes. The mixture was filtered through a membrane filter having a pore size of 0.7 μm. The thus obtained yellow ink Y was subjected to the argon dissolving treatment in the same manner as in the Example 1, so that yellow ink YA was prepared. In the same manner as in Example 1, the thus prepared yellow ink YA was accommodated in a package to provide an ink container, and the ink container was enclosed in a sealing wrapper, so as to provide an ink container-sealing wrapper assembly in which the ink container accommodating the yellow ink YA was enclosed.

Example 3

Preparation of Water-based Ink for Ink-jet Recording

Magenta ink M was obtained as follows: 64.2 parts by weight of purified water, 0.8 parts by weight of Color Index Number of Basic Red 1, 15 parts by weight of 2-pyrrolidone, 15 parts by weight of polyethylene glycol #200, and 5 parts by weight of tetraethylene glycol monobutyl ether were mixed and stirred for 30 minutes. The mixture was filtered through a membrane filter having a pore size of 0.7 μm. The thus obtained magenta ink M was subjected to the argon dissolving treatment in the same manner as in Example 1, so that magenta ink MA was prepared. In the same manner as in Example 1, the thus prepared magenta ink MA was accommodated in a package to provide an ink container, and the ink container was enclosed in a sealing wrapper, so as to provide an ink container-sealing wrapper assembly in which the ink container accommodating the magenta ink MA was enclosed.

Example 4

Preparation of Water-based Ink for Ink-jet Recording

Cyan ink C was obtained as follows: 69 parts by weight of purified water, 5 parts by weight of Color Index Number of Direct Blue 199, 11 parts by weight of glycerin, and 15 parts by weight of dipropylene glycol were mixed and stirred for 30 minutes. The mixture was filtered through a membrane filter having a pore size of 0.7 µm. The thus obtained cyan ink C was subjected to the argon dissolving treatment in the same manner as in Example 1, so that cyan ink CA was prepared. In the same manner as in Example 1, the thus prepared cyan ink CA was accommodated in a package to provide an ink container, and the ink container was enclosed in a sealing wrapper, so as to provide an ink container-sealing wrapper assembly in which the ink container accommodating the cyan ink CA was enclosed.

Example 5

There K was prepared an ink container-sealing wrapper assembly in which the ink container accommodating the black ink KA prepared in Example 1 was enclosed in a sealing wrapper in the same manner as in Example 1, except that the interior space within the sealing wrapper existing between the ink container and the sealing wrapper was charged with argon. More specifically described, the sealing wrapper which accommodates the ink container therein was placed in a chamber which is kept at a reduced pressure, in an open state of the sealing wrapper, in other words, prior to closing of the opening of sealing wrapper by thermal welding. After the interior space of the sealing wrapper has been exposed to the reduced pressure, the interior space of the sealing wrapper was charged with argon. Then, the opening of the sealing wrapper was closed by thermal welding, so that the interior space of the sealing wrapper in which the ink container was accommodated was filled with argon.

Example 6

There was prepared an ink container-sealing wrapper assembly in which the ink container accommodating the yellow ink YA prepared in Example 2 was enclosed in a sealing wrapper in the same manner as in Example 1, except that the interior space within the sealing wrapper existing between the ink container and the sealing wrapper was charged with argon.

Example 7

There was prepared an ink container-sealing wrapper assembly in which the ink container accommodating the magenta ink MA prepared in Example 3 was enclosed in a sealing wrapper in the same manner as in Example 1, except that the interior space within the sealing wrapper existing between the ink container and the sealing wrapper was charged with argon.

Example 8

There was prepared an ink container-sealing wrapper assembly in which the ink container accommodating the cyan, ink. CA prepared in Example 4 was enclosed in a sealing wrapper in the same manner as in Example 1, except that the interior space within the sealing wrapper existing between the ink container and the sealing wrapper was charged with argon.

Comparative Example 1

The black ink K prepared in Example 1 was subjected to a nitrogen dissolving treatment described below, so as to provide black ink KN. The nitrogen is an inert gas and has a molecular weight smaller than oxygen.

Nitrogen Dissolving Treatment

To an evaporator, there was connected a pressure-proof 500 mL-flask in which 200 mL of the black ink K was accommodated. With the pressure-proof flask being rotated at 120 rpm, the evaporator was evacuated to 4 kPa by using a vacuum pump. The evaporator was kept at the reduced pressure for 10 minutes. Then, the vacuum pump was stopped while nitrogen was introduced into the evaporator, so that the oxygen dissolved in the ink was removed and the nitrogen was dissolved in the ink. Thereafter, the pressure in the evaporator was returned to normal pressure. Thus, there was obtained the black ink KN.

In the same manner as in Example 1, the thus obtained black ink KN was accommodated in a package to provide an ink container, and the ink container was enclosed in a sealing wrapper, so as to provide an ink container-sealing wrapper assembly in which the ink container accommodating the black ink KN was enclosed.

Comparative Example 2

The yellow ink Y prepared in Example 2 was subjected to the nitrogen dissolving treatment in the same manner as in Comparative Example 1, so as to provide yellow ink YN. In the same manner as in Example 1, the obtained yellow ink YN was accommodated in a package to provide an ink container and the ink container was enclosed in a sealing wrapper, so as to provide an ink container-sealing wrapper assembly in which the ink container accommodating the yellow ink YN was enclosed.

Comparative Example 3

The magenta ink M prepared in Example 3 was subjected to the nitrogen dissolving treatment in the same manner as in Comparative Example 1, so as to provide magenta ink MN. In the same manner as in Example 1, the obtained magenta ink MN was accommodated in a package to provide an ink container and the ink container was enclosed in a sealing wrapper, so as to provide an ink container-sealing wrapper assembly in which the ink container accommodating the magenta ink MN was enclosed.

Comparative Example 4

The cyan ink C prepared in Example 4 was subjected to the nitrogen dissolving treatment in the same manner as in Comparative Example 1, so as to provide cyan ink CN. In the same manner as in Example 1, the obtained cyan ink CN was accommodated in a package to provide an ink container and the ink container was enclosed in a sealing wrapper, so as to provide an ink container-sealing wrapper assembly in which the ink container accommodating the cyan ink CN was enclosed.

Comparative Example 5

The black ink K prepared in Example 1 was subjected to a deaerating treatment described below, so as to provide black ink KU.

Deaerating Treatment

To an evaporator, there was connected a pressure-proof 500 mL-flask in which 200 mL of the black ink K was accommodated. With the pressure-proof flask being rotated at 120 rpm, the evaporator was evacuated to 4 kPa by using a vacuum pump. The evaporator was kept at the reduced pressure for 10 minutes. Then, the vacuum pump was stopped while air was introduced into the evaporator, so that the air including oxygen dissolved in the ink was removed. Thereafter, the pressure in the evaporator was returned to normal pressure. Thus, there was obtained the black ink KU.

In the same manner as in Example 1, the thus obtained black ink KU was accommodated in a package to provide an ink container and the ink container was enclosed in a sealing wrapper, so as to provide an ink container-sealing wrapper assembly in which the ink container accommodating the black ink KU was enclosed.

Comparative Example 6

The Yellow ink Y prepared in Example 2 was subjected to the deaerating treatment in the same manner as in Comparative Example 5, so as to provide yellow ink YU. In the same manner as in Example 1, the obtained yellow ink YU was accommodated in a package to provide an ink container and the ink container was enclosed in a sealing wrapper, so as to provide an ink container-sealing wrapper assembly in which the ink container accommodating the yellow ink YU was enclosed.

Comparative Example 7

The magenta ink M prepared in Example 3 was subjected to the deaerating treatment in the same manner as in Comparative Example 5, so as to provide magenta ink MU. In the same manner as in Example 1, the obtained magenta ink MU was accommodated in a package to provide an ink container and the ink container was enclosed in a sealing wrapper, so as to provide an-ink container-sealing wrapper assembly in which the ink,container accommodating the magenta ink MU was enclosed.

Comparative Example 8

The cyan ink C prepared in Example 4 was subjected to the deaerating treatment in the same manner as in Comparative Example 5, so as to provide cyan ink CU. In the same manner as in Example 1, the obtained cyan ink CU was accommodated in a package to provide an ink container and the ink container was enclosed in a sealing wrapper; so as to provide an ink container-sealing wrapper assembly in which the ink container accommodating the cyan ink CU was enclosed.

Evaluation

For each of the ink container-sealing wrapper assemblies according to Examples Nos. 1–8 and Comparative examples Nos. 1–8, an amount of dissolved oxygen was measured. Further, each ink container-sealing wrapper assembly was evaluated in terms of ink introduction property and ink ejection property. The measurement and evaluations were carried out in the following manner, and the results are indicated in the following TABLE 1. In the evaluations, there was used an on-demand type multiple-head ink-jet apparatus (ejection orifice diameter: 40 μm, drive voltage 30 V, drive frequency: 10 kHz) that performs recording by imparting, to the ink in the recording head, pressure generated by oscillation of piezoelectric elements so as to produce ink droplets.

(1) Measurement of the Amount of Dissolved Oxygen

The sealing wrapper of each of the ink container-sealing wrapper assemblies was opened immediately after each assembly was produced, and the ink container was taken out of the sealing wrapper. The water-based ink for ink-jet recording accommodated in each ink container was put into a beaker, and the amount of oxygen dissolved in the ink was measured by using a dissolved oxygen meter ("DO-OM14" available from HORIBA, Ltd.). The measured amount of oxygen dissolved in the ink of 1 L is represented by a unit of mL/L.

After each ink container-sealing wrapper assembly was left for 6 weeks in a thermostat ("PR-3S" available from ESPEC CORP.) in which the temperature was kept at 60° C. and the humidity was kept at 40% Rh, the sealing wrapper of each of the ink container-sealing wrapper assemblies was opened, and the ink container was taken out of the sealing wrapper. The amount of dissolved oxygen in the ink in each ink container was measured in the same manner as described above.

After each ink container-sealing wrapper assembly was left for 6 weeks in the thermostat in which the temperature was kept at 60° C. and the humidity was kept at 40% Rh, the sealing wrapper of each of the ink container-sealing wrapper assemblies was opened, and the ink container was taken out of the sealing wrapper. Then, the ink container was left at room temperature for 3 months. The amount of dissolved oxygen in the, ink in each ink container was measured in the same manner as, described above.

(2) Evaluation of Ink Introduction Property

The sealing wrapper of each of the ink container-sealing wrapper assemblies was opened immediately after each assembly was produced, and the ink container was taken out of the sealing wrapper. The ink container was installed on the ink-jet printer, and a purging operation (i.e., suction of the ink by the pump of the printer) was repeated three times. For evaluating the ink introduction property, a ratio of the number of nozzles through which the ink was ejected, to the number of all nozzles was obtained. The criteria of the evaluation are as follows:

⊚): The ratio of the number of the nozzles through which the ink was ejected to the number of all nozzles is 100%.

○: The ratio of the number of the nozzles through which the ink was ejected to the number of all nozzles is not smaller than 95% and less than 100%.

Δ: The ratio of the number of the nozzles through which the ink was ejected to the number of all nozzles is not smaller than 90% and less than 95%.

×: The ratio of the number of the nozzles through which the ink was ejected to the number of all nozzles is less than 90%.

After each ink container-sealing wrapper assembly was left for 6 weeks in the thermostat ("PR3S" available from ESPEC CORP.) in which the temperature was kept at 60° C. and the humidity was kept at 40% Rh, the sealing wrapper of each of the ink container-sealing wrapper assemblies was opened, and the ink container was taken out of the sealing wrapper. The ink introduction property was evaluated in the same manner as described above, for each ink container.

After each ink container-sealing wrapper assembly was left for 6 weeks in the thermostat in which the temperature was kept at 60° C. and the humidity was kept at 40% Rh; the sealing wrapper of each of the ink container-sealing wrapper assemblies was opened, and the ink container was taken out of the sealing wrapper. Then, the ink container was left at room temperature for 3 months. The ink introduction property was evaluated in the same manner as described above, for each ink container.

(3) Evaluation of Ink Ejection Property

The sealing wrapper of each of the ink container-sealing wrapper assemblies was opened immediately after each assembly was produced, and the ink container was taken out of the sealing wrapper. The ink container was installed on the ink-jet printer. After it was confirmed that the ink was ejected through all of the nozzles, a continuous printing operation on 100 sheets of paper was conducted. The ink ejection property was evaluated in terms of the number of printed paper in which unstable ink ejection was observed due to at least one nozzle which did not eject the ink with high stability. The criteria of the evaluation are as follows:

⊚: The number of the printed sheets in which unstable ink ejection was observed is zero.
○: The number of the printed sheets in which unstable ink ejection was observed is in a range of 1–2.
Δ: The number of the printed sheets in which unstable ink ejection was observed is in a range of 3–5.
×: The number of the printed sheets in which unstable ink ejection was observed is not smaller than 6.

After each ink container-sealing wrapper assembly was left for 6 weeks in the thermostat ("PR-3S" available from ESPEC CORP.) in which the temperature was kept at 60° C. and the humidity was kept at 40% Rh, the sealing wrapper of each of the ink container-sealing wrapper assemblies was opened, and the ink container was taken out of the sealing wrapper. The ink ejection property was evaluated in the same manner as described above, for each ink container.

After each ink container-sealing wrapper assembly was left for 6 weeks in the thermostat in which the temperature was kept at 60° C. and the humidity was kept at 40% Rh, the sealing wrapper of each of the ink container-sealing wrapper assemblies was opened, and the ink container was taken out of the sealing wrapper. Then, the ink container was left at room temperature for 3 months. The ink ejection property was evaluated in the same manner as described above, for each ink container.

TABLE 1

| Example No. | Ink Composition | State in Sealing wrapper | Amount of dissolved oxygen (mL/L) | | | Evaluation of Ink Introduction propety | | | Evaluation of Ink Ejection property | | |
|---|---|---|---|---|---|---|---|---|---|---|---|
| | | | Immediately after production | After Storage at 60° C. for 6 weeks | After Storage at 60° C. for 6 weeks and at room temperature for 3 months | Immediately after production | After Storage at 60° C. for 6 weeks | After Storage at 60° C. for 6 weeks and at room temperature for 3 months | Immediately after production | After Storage at 60° C. for 6 weeks | After Storage at 60° C. for 6 weeks and at room temperature for 3 months |
| Present invention | | | | | | | | | | | |
| 1 | KA | vacuum | 0.5 | 1.7 | 2.8 | ⊚ | ⊚ | ⊚ | ⊚ | ⊚ | ⊚ |
| 2 | YA | vacuum | 0.7 | 1.9 | 3.0 | ⊚ | ⊚ | ⊚ | ⊚ | ⊚ | ○ |
| 3 | MA | vacuum | 0.6 | 1.7 | 2.9 | ⊚ | ⊚ | ○ | ⊚ | ⊚ | ○ |
| 4 | CA | vacuum | 0.7 | 1.7 | 2.8 | ⊚ | ⊚ | ⊚ | ⊚ | ⊚ | ⊚ |
| 5 | KA | argon | 0.5 | 0.9 | 2.2 | ⊚ | ⊚ | ⊚ | ⊚ | ⊚ | ⊚ |
| 6 | YA | argon | 0.7 | 0.9 | 2.4 | ⊚ | ⊚ | ⊚ | ⊚ | ⊚ | ⊚ |
| 7 | MA | argon | 0.6 | 0.9 | 2.4 | ⊚ | ⊚ | ⊚ | ⊚ | ⊚ | ⊚ |
| 8 | CA | argon | 0.7 | 0.9 | 2.4 | ⊚ | ⊚ | ⊚ | ⊚ | ⊚ | ⊚ |
| Comparative Examples | | | | | | | | | | | |
| 1 | KN | vacuum | 0.8 | 2.8 | 3.7 | ⊚ | ⊚ | × | ⊚ | ○ | Δ |
| 2 | YN | vacuum | 0.9 | 2.6 | 3.6 | ⊚ | ⊚ | ○ | ⊚ | ○ | Δ |
| 3 | MN | vacuum | 1.1 | 2.6 | 3.6 | ⊚ | ⊚ | Δ | ⊚ | ○ | Δ |
| 4 | CN | vacuum | 1.0 | 2.7 | 3.5 | ⊚ | ⊚ | ○ | ⊚ | ⊚ | Δ |
| 5 | KU | vacuum | 1.8 | 3.3 | 3.7 | ⊚ | × | × | ⊚ | Δ | Δ |
| 6 | YU | vacuum | 1.8 | 3.4 | 3.6 | ⊚ | ○ | ○ | ⊚ | Δ | Δ |
| 7 | MU | vacuum | 1.8 | 3.4 | 3.5 | ⊚ | ○ | Δ | ⊚ | Δ | Δ |
| 8 | CU | vacuum | 1.8 | 3.4 | 3.5 | ⊚ | ○ | ○ | ⊚ | Δ | Δ |

As will be apparent from the results indicated in the TABLE 1; the ink introduction property and the ink ejection property were good in the ink container-sealing wrapper assemblies according to Examples Nos. 1–4 each accommodating the water-based ink for ink-jet recording in which argon is dissolved and the amount of dissolved oxygen is less than 3 mL/L. The reason for this is speculated as follows: In the water-based ink of each of the ink container-sealing wrapper assemblies according to Examples Nos. 1–4, the argon is dissolved such that the partial pressure of the argon is higher than that of the oxygen. Owing to the high partial pressure of the argon in the package of the ink container, the amount of oxygen to be dissolved in the ink is small even if the oxygen permeates through the package due to exposure of the package to the air, since the partial pressure of the oxygen in the package is low. Further, since the argon is less likely to permeate through, the package owing to its relatively large molecular weight, the high partial pressure of the argon in the package can be maintained, so that the oxygen is less likely to be dissolved in the ink. Accordingly, the argon dissolved in the water-based ink makes it possible to inhibit an increase in the amount of oxygen to be dissolved in the ink, so that the water-based ink does not suffer from undesirable changes in its properties and agglomerates or deposits, resulting in good ink introduction property and the ink ejection property. The ink introduction property and the ink ejection property were better, than those ink container-sealing wrapper assemblies according to Examples Nos. 1–4, in the ink container-sealing wrapper assemblies according to Examples Nos. 5–8 in which the interior space within the sealing wrapper existing between the ink container and the sealing wrapper of each assembly is filled with argon. Accordingly, it is recognized that an increase of the amount of the oxygen dissolved in the ink can be prevented over a long period of time. In contrast, the ink container-sealing wrapper assemblies according to Comparative Examples Nos. 1–4 each accommodating the water-based ink in which the nitrogen is dissolved and the ink container is enclosed with the sealing wrapper the interior space of which is evacuated were inferior, in terms of the ink introduction property and the ink ejection property, to the ink container-sealing wrapper assemblies according to Examples Nos. 1–4 each accommodating the water-based ink in which the argon is dissolved and the ink container is enclosed with the sealing wrapper the interior space of which is evacuated. As is apparent from the results indicated in the TABLE 1, in each of the conditions (a) immediately after production of each ink container-sealing wrapper assembly, and (b) after the storage of each ink container-sealing wrapper assembly at 60° C. for 6 weeks, the amount of oxygen dissolved in each of the ink of the assemblies according to Comparative Examples Nos. 1–4 was larger than that in each of the ink of the assemblies according to Examples Nos. 1–4. The reason for this is speculated as follows: The package of the ink container is exposed to the air which permeates through the sealing wrapper. Since the nitrogen is likely to permeate through the package of the ink container owing to its relatively small molecular weight, the nitrogen tends to go out of the package into the interior space of the sealing wrapper and the oxygen which permeates through the sealing wrapper enters the package, so that the ratio of the partial pressure of the nitrogen in the package to that of the oxygen is likely to change due to exposure of the package to the air which permeates through the sealing wrapper, as compared with the ratio of the partial pressure of the argon in the package to that of the oxygen. Namely, the partial pressure of the oxygen in the package was increased, whereby the amount of oxygen dissolved in the ink measured immediately after production of each assembly and the amount of dissolved oxygen measured after the storage of each assembly at 60° C. for 6 weeks were larger in the assemblies according to Comparative Examples Nos. 1–4 than in the assemblies according to Examples Nos. 1–4. Further, in the condition (c) in which each assembly was left at 60° C. for 6 weeks, subsequently the ink container was taken out of the sealing wrapper, and the ink container was left at room temperature for 3 months, the amount of dissolved oxygen was larger in the assemblies according to Comparative Examples Nos. 1–4 than in the assemblies according to Examples Nos. 1–4. The ink container was kept exposed to the air after it was taken out of the sealing wrapper. As described above, since the nitrogen is likely to permeate through the package, the nitrogen goes out of the package, so that the partial pressure of the oxygen in the package was increased due to exposure of the package to the air. Accordingly, the amount of dissolved oxygen was increased due to the increased partial pressure of the oxygen in the package. Therefore, it is supposed that the ink introduction property and the ink ejection property were deteriorated in the assemblies according to Comparative Examples Nos. 1–4 due to the increase of the amount of oxygen dissolved in the ink.

What is claimed is:

1. An ink container including water-based ink for ink-jet recording and a package in which said water-based ink is accommodated,
    wherein said water-based ink includes an inert gas dissolved therein and an amount of oxygen dissolved in said water-based ink for ink-jet recording is less than 3 mL/L, and
    wherein said package has oxygen permeability of not greater than 1.0 mL/m$^2$·24 hr·atm.

2. The ink container according to claim 1, wherein said inert gas is dissolved in said water-based ink such that said inert gas is in a saturated state in said ink.

3. The ink container according to claim 1, wherein said inert gas is dissolved in said water-based ink such that said inert gas is in a substantially saturated state in said ink.

4. The ink container according to claim 1, wherein said inert gas comprises argon.

5. The ink container according to claim 1, wherein said package includes an ink bag having a laminar structure which includes at least a resin film layer and a metal film layer that are superposed on each other, and an ink inlet formed of resin.

6. The ink container according to claim 5, wherein said laminar structure of said ink bag is one of: a laminar structure consisting of a polyamide layer, an aluminium alloy layer, a polyethylene terephthalate layer, and a polypropylene layer which are superposed on one another; a polyethylene terephthalate film on which alumina is deposited; and aluminium foil on which a polyethylene film is laminated.

7. The ink container according to claim 5, wherein said resin film layer is one of ethylene vinyl alcohol copolymer and polyamide.

8. The ink container according to claim 1, wherein said package has oxygen permeability of not greater than 0.5 mL/m$^2$·24 hr·atm.

9. An ink container-sealing wrapper assembly, including:
    an ink container including water-based ink for ink-jet recording and a package in which said water-based ink is accommodated, wherein said water-based ink includes an inert gas dissolved therein and an amount of oxygen dissolved in said water-based ink for ink-jet recording is less than 3 mL/L, and
    a sealing wrapper in which said ink container is accommodated, an interior space within said sealing wrapper existing between said ink container and said sealing wrapper being charged with an inert gas.

10. The ink container-sealing wrapper assembly according to claim 9, wherein said inert gas comprises argon.

11. The ink container-sealing wrapper assembly according to claim 9, wherein said sealing wrapper is formed of at least one film formed of resin, said resin being selected from the group consisting of polyester, polyethylene, polypropylene, and polyamide.

12. The ink container-sealing wrapper assembly according to claim 11, wherein said at least one film formed of resin includes alumina deposited thereon.

13. The ink container-sealing wrapper assembly according to claim 9, further including a casing in which said ink container is accommodated, and an interior space of said casing is charged with said inert gas.

14. The ink container-sealing wrapper assembly according to claim 9, wherein said inert gas is dissolved in said water-based ink such that said inert gas is in a saturated state in said ink.

15. The ink container-sealing wrapper assembly according to claim 9, wherein said inert gas is dissolved in said water-based ink such that said inert gas is in a substantially saturated state in said ink.

16. The ink container-sealing wrapper assembly according to claim 9, wherein said package includes an ink bag having a laminar structure which includes at least a resin film layer and a metal film layer that are superposed on each other, and an ink inlet formed of resin.

17. The ink container-sealing wrapper assembly according to claim 16, wherein said laminar structure of said ink bag is one of a laminar structure consisting of a polyamide layer, an aluminium alloy layer, a polyethylene terephthalate layer, and a polypropylene layer which are superposed on one another; a polyethylene terephthalate film on which alumina is deposited; and aluminium foil on which a polyethylene film is laminated.

18. The ink container-sealing wrapper assembly according to claim 16, wherein said resin film layer is one of ethylene vinyl alcohol copolymer and polyamide.

19. The ink container-sealing wrapper assembly according to claim 9, wherein said package has oxygen permeability of not greater than $1.0 \text{ mL/m}^2 \cdot 24 \text{ hr} \cdot \text{atm}$.

20. The ink container-sealing wrapper assembly according to claim 19, wherein said package has oxygen permeability of not greater than $0.5 \text{ mL/m}^2 \cdot 24 \text{ hr} \cdot \text{atm}$.

* * * * *